(12) United States Patent
Bolton et al.

(10) Patent No.: US 8,206,620 B1
(45) Date of Patent: Jun. 26, 2012

(54) OPTICALLY CLEAR FIRE RESISTANT WINDOWS

(75) Inventors: Nelson Bolton, Trumbauersville, PA (US); W. Novis Smith, Philadelphia, PA (US); Elizabeth Wimmer, Palm, PA (US)

(73) Assignee: AGP Plastics, Inc., Trumbauersville, PA (US)

( * ) Notice: Subject to any disclaimer, the term of this patent is extended or adjusted under 35 U.S.C. 154(b) by 382 days.

(21) Appl. No.: 12/462,884

(22) Filed: Aug. 11, 2009

(51) Int. Cl.
*C09K 21/00* (2006.01)
*C09K 21/04* (2006.01)
*C09K 21/10* (2006.01)
*C03B 19/00* (2006.01)
*E06B 3/00* (2006.01)
*E06B 7/00* (2006.01)
*E04C 2/54* (2006.01)

(52) U.S. Cl. .................. 252/601; 52/204.5; 52/204.593; 52/786.13; 65/17.1

(58) Field of Classification Search .................. 252/601
See application file for complete search history.

(56) References Cited

U.S. PATENT DOCUMENTS 5,188,664 A * 2/1993 Adamic et al. ............. 106/31.58
5,539,141 A * 7/1996 Dorn et al. .................... 558/72

* cited by examiner

*Primary Examiner* — Mark Eashoo
*Assistant Examiner* — Peter F Godenschwager
(74) *Attorney, Agent, or Firm* — John Lezdey

(57) ABSTRACT

There is provided a composition and a method for forming fire resistant panes containing borate-phosphate anions and the window pane and window assemblies prepared therefrom.

13 Claims, No Drawings

OPTICALLY CLEAR FIRE RESISTANT WINDOWS

FIELD OF THE INVENTION

The present invention relates to the use of optically clear fire resistant and non-flammable compositions containing borate-phosphate anions which can be cast or poured hot into molds or onto flat window panes. Additionally, there is a fire resistant window assembly which incorporates the fire resistant pane formed by the compositions of the invention.

BACKGROUND OF THE INVENTION

It is desirable that fire resistant windows meet the following requirements:
1. Optical clarity
2. Does not emit smoke when exposed to fire
3. Does not emit toxic fumes when exposed to fire
4. The windows can withstand jarring shocks when mounted in doors.
5. Prevents the transfer of heat to the opposite side of the flame.

Recent prior art attempts to make fire resistant windows have been to provide a liquid medium or gel between fire resistant glass or polymer sheets.

Earlier prior art describes many versions of fire resistant windows. The initial ones were those with imbedded wire in glass. These were unsatisfactory due to breakage under high heat conditions and general overall loss of total transparency due to presence of wire, but there was nothing better. Subsequently fire resistant windows were developed which were formed with the actual window body having the outside glass panes and then a mixture of acrylamide and water with a catalyst were poured into the cavity between the panes of glass and the acrylamide allowed to polymerize forming a stable water gel.

This was a messy process subject to high unit losses during manufacturing. The performance of these units was usually adequate up to 30-40 minutes. Longer times could be achieved, but required significant increases in thickness and weight which is not acceptable. The steam formed by these units when subjected to high heat would immediately blow out the front glass pane. The resulting black char provided reasonable fire and thermal resistance. The subsequent development of gels formed from aluminum phosphate and optionally with borates was an improvement because the toxic acrylamide monomer was not involved. However, these gels took up to 24 hours to form and set in the window mold which was also not desirable and makes for high unit losses during manufacturing. In addition, the high water content of these systems causes the window to fail more rapidly due to the vast amounts of steam (from the contained water in the gel formed during direct flame impingement). The steam pressure actually blow out the front glass panes and even the back panes. Again, this happens in both the cases of the polyacrylamide and aluminum phosphate gels with water. In addition, these gels usually contain a sufficient amount of organic material to promote the gel formation which tends to carbonize during the flame impingement. The organic compounds usually convert to carbon foam which absorbs heat and reradiates heat (emissivity) as intumescent coatings do. However, this is not as efficient as direct reflectivity of the heat by a white body in cooling the back side of the window. There have been many fire window developments using castable compositions based on aluminum phosphates with the addition of diethanol amine and monoalkanol amines which after casting slowly hardens over 24 hours. All of these contain a significant amount of water which is undesirable in that the steam pressure is so great during fire impingement that the failure mode tends to be the blasting away of the front glass pane and possible the back ones depending on the window construction. Although the intumescent layer may hold in place, it is weak and is easily pushed aside in the fire hose test.

High temperature glasses have been developed based on lithium and alumina silicates which are difficult to manufacture and expensive in general and are difficult to make in sizes larger than 30" wide. These are still limited in that they also still melt slowly at the temperature of the required testing and therefore still have difficulty meeting the one hour 900° C. flame test for 1 hour and do not insulate the back pane of the window causing excessive heat transfer. In addition, the haze levels are higher than standard window panes (reduced transparency).

What is needed for further improvement in the performance of fire windows is a hot castable, optically clear non flammable layer which does not melt when subjected to 900° C. flame (as glass does) and contains a low percentage water (<15%). It is preferred that it forms a white foam when subjected to an intense flame which is stable, insulative, and maintains a reflective white foam layer and has a relatively low water content (<15%) to minimize steam formation during this process. The composition must pour at a higher temperature (with low water content which is low enough to avoid kicking over to the white foam (intumesce), and yet when cooled to room temperature or in the hot sun does not melt. It is preferred that it immediately hardens as it is cast for east of manufacture and is ready to laminate. Post drying is satisfactory as long as the unit maintains its properties which are non-flammable, low water, optically clear and good impact resistance.

U.S. Pat. No. 4,264,681 to Girard et al, relates to fire resistant windows having spaces filled with an aqueous gel consisting of organic titanates, organic zirconates and silanes. The gel tends to bubble under jarring shock.

Fierch application Ser. No. 76/09227 discloses a fire resistant window wherein the intermediate gap between panes is filled with a gel that foams under extreme heat and contains mineral salts which causes a loss in optical clarity.

U.S. Pat. No. 5,449,560 to Antheunis relates to liquid curable compositions prepared from polydiorganosiloxanes and polyhydrogen organosilanes as an interlayer for a laminate of glass.

U.S. Pat. No. 5,124,208 to Bolton et al, which is herein incorporated by reference relates to a window assembly which can be used by the present invention.

Other fire resistant windows of interest include U.S. Pat. Nos. 7,090,906; 6,159,606; 5,885,713; 5,543,230 and 5,696,288 which are herein incorporated by reference.

SUMMARY OF THE INVENTION

According to the invention there is provided a composition for forming a meltable and castable pane for forming fire resistant window assemblies. The composition comprises;
a) about 10 to 40% by weight of Tris (hydroxymethyl) aminomethane and/or at least one member of the group consisting of aliphatic polyols and alicyclic polyols
b) about 10 to 30% by weight of a member selected from the group consisting of triammonium phosphate, ammonium dibasic phosphate, ammonium monobasic phosphate and phosphoric acid;
c) about 35 to 65% by weight of a member selected from the group consisting of sodium teraborate, sodium metaborate, sodium borate, potassium borate; lithium borate; boric acid, boric anhydride and ammonium borate and alkaline borates;

d) about 0 to 25% by weight of a member selected from the group consisting of sodium dihydrogen phosphate, sodium monobasic phosphate, potassium dihydrogen phosphate, lithium dihydrogen phosphate, sodium dibasic phosphate and potassium dibasic phosphate, and sodium and potassium phosphates, and their hydrates, and e) about 10 to 35% by weight water.

It is a general object of the invention to provide a composition for preparing a fire resistant window pane.

It is another object of the invention to provide a fire resistant window pane assembly.

It is a still a further object of the invention to provide a fire resistant window which additionally has good impact resistance.

It is still a further object of the invention to provide a fire resistant to provide heat insulating barrier.

It is yet another object of the invention to provide a fire resistant window having good optical clarity and is free of foam bubbles when jarred.

DESCRIPTION OF THE PREFERRED EMBODIMENTS

The invention describes a new class of optically clear meltable/castable fire resistant and non-flammable compositions which can be cast or poured hot into molds or into flat window panes. The optically clear window panes made from this new class of non-flammable compositions are laminated directly or with a clear plastic inner layer such as an ionomer (Surlyn or Noviflex), Ionoplast®, polyurethane, or PVB, etc. to glass panes which form the outer protective pane. Fire resistant windows of this class are required to withstand direct flame of 900° C. for 20 minutes and up to at least 60 minutes without physically failing such that a hose water stream can impinge directly on the hot outer surface without penetrating through the window frame. In addition, the resultant window constructed with the non-flammable clear pane insulates and maintains the side away from the flame below 60° C. for 60 minutes. In addition, these new non-flammable optically clear panes also have impact resistance so that the totally constructed window incorporating the new non-flammable pane can pass both the testing for hurricane windows, impact resistance security windows and at the same time pass the fire resistance requirements for the fire resistant window. Over and above that due to the synergistic make up of the various panes, the complete window has significant sound insulation properties.

The fire resistant pane of the invention can be prepared utilizing a composition which comprises;

a) about 10 to 40% by weight of Tris (hydroxymethyl) aminomethane and/or at least one member of the group consisting of aliphatic polyols and alicyclic polyols and triethanolamine;

b) about 10 to 30% by weight of a member selected from the group consisting of ammonium phosphate, phosphoric acid, ammonium dibasic phosphate, ammonium dihydrogen phosphate, phosphoric acid and triammonium phosphate;

c) about 35 to 65% by weight of a member selected from the group consisting of alkali metal borate, ammonium borate and its hydrate, sodium teraborate decahydrate, sodium borate, potassium borate; lithium borate; sodium meta borate tetrahydrate, boric acid, boric anhydride and ammonium borate;

d) about 0 to 25% by weight of a member selected from the group consisting of sodium phosphate, potassium phosphate and their hydrates, trisodium phosphate, disodium phosphate, sodium dihydrogen phosphate, sodium monobasic phosphate, potassium dihydrogen phosphate, and lithium dihydrogen phosphate, sodium dibasic phosphate and potassium dibasic phosphate, and e) about 10 to 35% by weight water.

The aliphatic and alicyclic polys include glycerol, 2 hydroxy-1,3-propanediol, tetraethanol amine, diethanol amine, and monoethanol amine, triethanol amine.

A preferred composition for forming the intermediate pane of the invention comprises;

a) about 10 to 25% by weight of Tris (hydroxymethyl) aminomethane;

b) about 10 to 25% by weight of ammonium dibasic phosphate;

c) about 30 to 40% by weight of sodium borate decahydrate, and d) about 10 to 30% by weight water.

The addition of triols and other polyols prevents crystal formation on coating and promotes the formation of a solid glass with maximum optical transparency especially in the presence of the borates.

Trivalent cations such as aluminum or divalent cations such as magnesium are not used since they tend to create haze in low water content systems.

Preparation of Pane

The compositions are prepared by mixing the components in a minimum amount of water and heating to 100° C. to effect absolutely clear transparent solutions in a heated reactor with a bottom discharge valve. The mixture is stirred and heated to 115-140° C. removing the free or excess water. (The mixture starts to haze up above 150° C. due to "kicking over" or intumescing, and the temperature must be kept under control and below this point.) The molten liquid is then run into heated flat molds to form the panes of non-flammable fire resistant panes for the fire resistant windows. The optically clear flat panes upon cooling are very hard and can be physically lifted or removed from the mold. If the mold is actually a component part of the fire resistant window, it is left in place and the part used as is. The composition contains approximately 10% water as measured by weight loss at 120° C. under vacuum for 4 hours. It is actually chemically bound water.

In some cases as an option to further reduce volatiles, the fire resistant pane is placed in a oven at 100° C. for 4-6 hours to further reduce volatiles (water) carefully or in a low humidity room (<25% relative humidity). This is an optional post treatment depending on the length of time the qualifying heat resistance test is to run (>60 minutes).

The basic advantages of the phosphate borate ester glass over prior art is that it has a low enough melting point to be cast or poured readily (<60° C.) although viscous into the desired shape with a low water content (<10%). The higher the water content the more detrimental under high heat impingement on the fire resistant window due to excessive steam formation. The window is ready to be assembled after cooling, a matter of minutes much faster than previous phosphate systems. The fire resistant pane has exceptional optical transparency window due to the fact that it contains no multivalent cations, and the borate-phosphate anions form a complex non-stoichiometric ester with the Tris triol present which prevents any crystallization of the inorganic compounds present. This a true inorganic/organic fire resistant glass with strength. As the pane is heated it quickly kicks over early into the intumescent version which is non melting. The organic portion does not carbonize and a white inorganic foam results which is non-melting at 900° C., highly reflective and insulating and is very effective in preventing heat transmission through the complete fire resistant window assembly.

The fire resistant (FR) pane can be inserted and laminated directly to glass which serves as the outer protection for abrasion resistance and added impact resistance. However the use of optically clear ionomer laminating films such as Surlyn® or NoviFlex® or Ionoplast® works very well. Other laminating films such as PVB and polyurethane also work. The plastic laminating film is kept thin in order to minimize contribution to the fire when the unit is subjected to high heat flux. However the laminating film aids in increasing the impact resistance of the whole FR window assembly.

In assembling the whole unit it has been found that placing an air gap or layer adjacent to the FR pane on one or both sides is effective in preventing any blow out by steam or gasses formed during high heat flux on the front of the FR window assembly.

EXAMPLE 1

Preparation of FR Pane

To 25 g of DI water at 50° C. is added with stirring 40 g of Tris (hydroxymethyl) aminomethane, 40 g of ammonium dibasic phosphate, 75 g of sodium borate decahydrate.

The mixture was heated up to 115-120° C. to boil off water. The resultant clear viscous liquid was poured out and pressed flat. The FR pane which was formed was optically clear and withstood 900° C. flame for 30 minutes.

When placed in a window assembly of a thickness of 1-5 inches, the front tempered glass pane remains in place. The back tempered glass pane remains cool to hand touch up to 50 minutes into test and never exceeds 200° C.

EXAMPLE 2

Preparation of Pane

To 25 g of DI water at 50° C. is added with stirring 25 g of Tris (hydroxymethyl) aminomethane, 100 g of sodium borate decahydrate, and 25 g of ammonium dibasic phosphate. The mixture was heated to 115-120° C. to boil off water.

The resultant clear viscous liquid was poured out onto a flat chemically treated glass plate and covered with another glass plate. This was inserted into a window assembly leaving a 2 mm air gap.

In lieu of ammonium dibasic phosphate there may be used sodium dibasic phosphate or ammonium monobasic phosphate.

EXAMPLE 3

Preparation of FR Pane

To 30 g of DI water at 50° C. is added 50 g of glycerol, 50 g of ammonium monobasic phosphate, and 75 g of sodium borate decahydrate. The mixture was heated to 115-120° C. to boil off water and then poured onto a glass plate and covered with NOVIFLEX ionomer.

When cooled the panes were placed into a window assembly.

What is claimed is:

1. A meltable and pourable composition for forming a fire resistant window pane which comprises;
    a) about 10 to 40% by weight of Tris (hydroxymethyl) aminomethane;
    b) about 10 to 30% by weight of a member selected from the group consisting of, ammonium dibasic phosphate, ammonium phosphate and their hydrates and phosphoric acid;
    c) about 35 to 65% by weight of a member selected from the group consisting of sodium tetraborate decahydrate, sodium borate, potassium borate; lithium borate; boric acid, alkali metal borates and their hydrates, ammonium borate, and boric anhydride;
    d) about 0 to 25% by weight of a member selected from the group consisting of sodium phosphate, sodium and potassium dihydrogen phosphate, sodium and potassium monobasic phosphate and their hydrates, and lithium dihydrogen phosphate, and
    e) about 10 to 30% by weight water.

2. The composition of claim 1 which is free of divalent and trivalent cations.

3. A method for forming a fire proof window pane which comprises heating the composition of claim 1 to form a clear solution, heating to 115-140° C. to remove excess water and then casting or pouring the resultant composition to form a pane.

4. The method of claim 3 wherein the resultant composition is poured into a mold.

5. The method of claim 3 wherein the resultant composition is placed between two panes.

6. The method of claim 3 including forming a window assembly.

7. A window assembly comprising a pane made by the method of claim 3.

8. A window assembly of claim 7 in which at least one air gap is present on one side of the fire resistant pane.

9. A meltable and pourable composition for forming a fire resistant window pane which comprises:
    a) about 10 to 25% by weight of Tris (hydroxymethyl) aminomethane;
    b) about 10 to 25% by weight of ammonium dibasic phosphate;
    c) about 30 to 40% by weight of sodium borate decahydrate, and
    d) about 10 to 30% by weight water.

10. A method for forming a fire proof window pane which comprises heating the composition of claim 9 to form a clear solution, heating to 115-140° C. to remove excess water and then casting or pouring the resultant composition to form a pane.

11. The method of claim 10 wherein the resultant composition is poured into a mold.

12. The method of claim 10 wherein the resultant composition is placed between two panes.

13. The method of claim 10 including forming a window assembly.

\* \* \* \* \*